Jan. 5, 1926.
W. H. CAVER
1,568,798
SKILLET
Filed Jan. 16, 1925
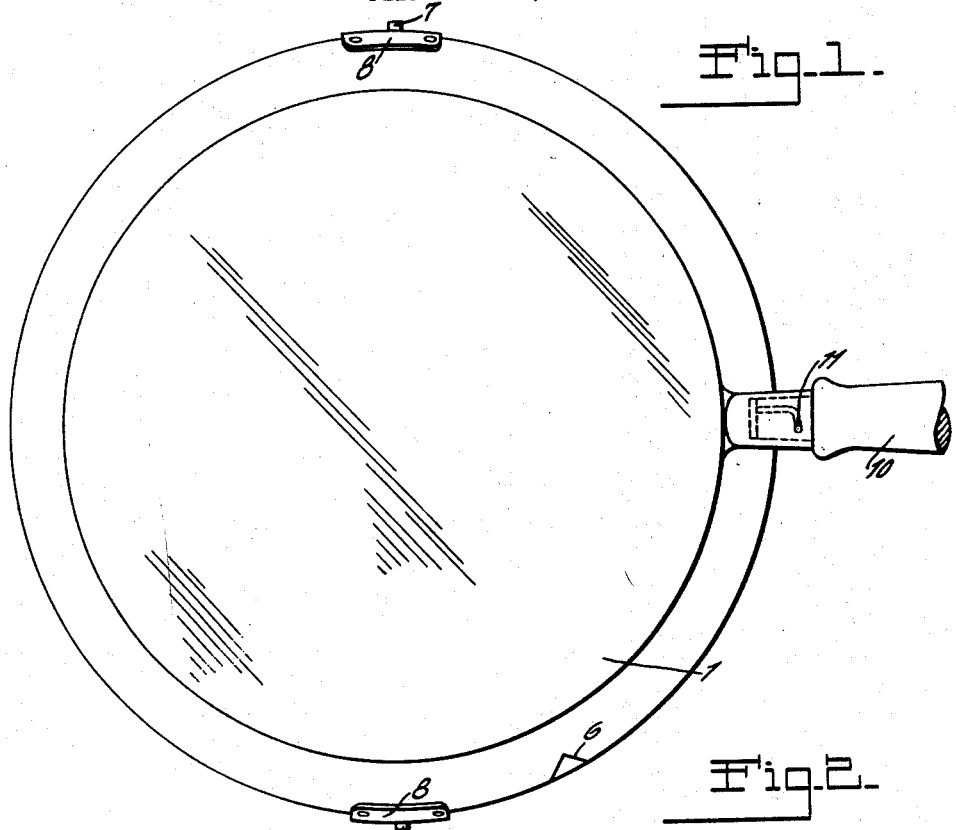
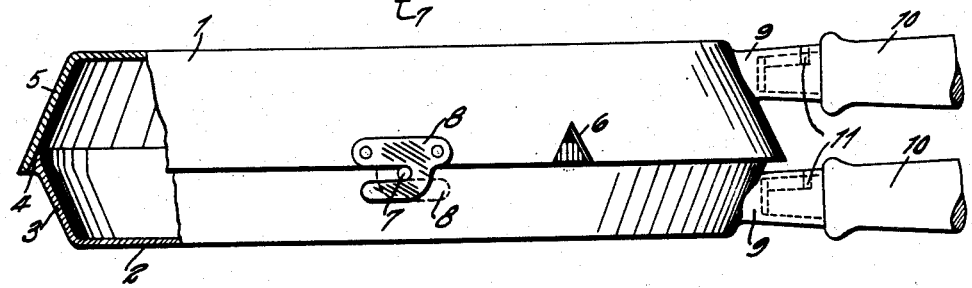
Inventor.
WILLIAM H. CAVER.
Attorney.

Patented Jan. 5, 1926.

1,568,798

UNITED STATES PATENT OFFICE.

WILLIAM H. CAVER, OF BOONVILLE, MISSISSIPPI.

SKILLET.

Application filed January 16, 1925. Serial No. 2,856.

*To all whom it may concern:*

Be it known that I, WILLIAM H. CAVER, a citizen of the United States, and residing at Boonville, county of Prentiss, State of Mississippi, have invented the new and useful Improvement in Skillets, of which the following is a specification.

This invention pertains to skillets.

One of the objects of this invention is to provide an improved skillet of the type in which a pair of mutually engageable pans are arranged so that one pan provides a cover for the other, in which the pans may be simply and securely locked together.

Another object is to provide such a skillet having improved means for fitting one pan upon the other and securing the two together.

Further objects will appear from the following description taken in connecton with the accompanying drawing in which:

Figure 1 is a plan view of a skillet embodying this invention; and

Figure 2 is a side view, partly in section, of Figure 1.

Referring now to the drawing 1 designates the upper, and 2 the lower of a pair of mutually engageable pans. The lower pan 2 may be provided with flaring sides 3 and a beveled upper rim 4. The upper pan 1 may be provided with flaring sides 5 whose rim is adapted to fit the tapered rim 4 of the lower adapted to fit the tapered rim 4 of the lower pan. The pans are thus adapted for mutual engagement, the upper pan fitting snugly upon the rim of the lower pan and providing a cover therefor. The rim of the upper pan may be provided with a notch 6 to permit the escape of steam and vapors.

The lower pan may be provided at opposite sides thereof with a pair of pins 7 or other suitable locking elements and the upper pan may be provided at corresponding points with downwardly extending hooks 8 adapted to engage the pins 7 for locking the pans together as shown in Figure 2. The hooks 8 on opposite sides of the pan are faced in opposite directions as shown in dotted lines in Figure 2. This arrangement provides that the pans may be locked together by first setting one upon the other and then rotating the two relatively so as to bring the pins 7 into engagement with the hooks 8. This construction provides not only a firm seat for one pan upon the other, but the two pans are securely locked together against any possibility of accidental displacement.

Each pan may be provided with a ferrule 9 adapted to receive a handle 10 detachably secured in the ferrule 9 by means of a bayonet joint 11. The pans are thus provided with detachable handles by means of which they may be manipulated either individually or together and for engaging and disengaging them with one another. The handles are quickly and easily detachable so that when the skillet is placed in position for cooking the handles may be removed so as to prevent them from becoming too hot to handle or from deterioration due to over-heating.

It will be seen, therefore, that this invention provides a skillet of substantial construction on which means are provided for seurely seating one pan upon the other and for locking the same securely together. It will be noted that the oppositely facing clamping elements 8 are so constructed as to cooperate with the elements 7 when the handles thereon are brought into alinement in order to lock the pan parts together in sealed relation. Furthermore these elements are adapted upon such cooperation to lock the handles in alined relation. One of the pan parts has its rim provided with an outside bearing, while the cooperating pan part has its rim flared to take over the bearing. Accordingly the pan parts are tightly locked in sealed relation when the handles are in alined relation. The parts are so constructed that there is no opportunity for grease or food to collect in recesses, but the parts may be readily cleaned and can be kept clean. The provision of the notch in one of the rims provides a simple vent while still maintaining the pan part as a receptacle. The handles are detachable after the pan has been placed in cooking position and are again readily attachable when required for manipulating the skillet or the individual pans.

It is obvious that various changes may be made in the details of construction without departing from the spirit of this invention; it is to be understood, therefore, that this invention is not to be limited to the specific details shown and described.

Having thus described the invention what is claimed is:

1. A skillet comprising a pan and a cover engaging one another rotatively along their rims, a handle on and projecting radially from each of said parts, and locking elements on one of said parts adapted to cooperate with elements on the other of said parts only when the handles thereon are brought into alinement in order to lock said parts together in sealed relation.

2. A skillet comprising a pan and a cover engaging one another rotatively along their rims, a handle on and projecting radially from each of said parts, and oppositely facing locking elements on one of said parts adapted to cooperate with elements on the other of said parts only when the handles thereon are brought into alinement in order to lock said parts together in sealed relation.

3. A skillet comprising a pan and a cover engaging one another rotatively along their rims, a handle on and projecting radially from each of said parts, and locking elements on one of said parts adapted to cooperate with elements on the other of said parts when the handles thereon are brought into alinement in order to lock said parts together in sealed relation, said elements being adapted upon such cooperation to always locate said handles in alined relation.

4. A skillet comprising a pan and a cover engaging one another rotatively along their rims, one of said parts having a rim and an outside bearing provided thereon and the other of said parts having a rim flared to take over said bearing, a handle on and projecting radially from each of said parts, and locking elements on one of said parts adapted to cooperate with elements on the other of said parts only when the handles thereon are brought into alinement in order to lock said parts together in sealed relation.

5. A skillet comprising a pan and a cover engaging one another rotatively along their rims, a handle on and projecting radially from each of said parts, and locking elements on one of said parts adapted to cooperate with elements on the other of said parts only when the handles thereon are brought into alinement in order to lock said parts together in sealed relation, one of said rims being notched to provide a vent.

In testimony whereof I affix my signature this 3rd day of Jan., 1925.

WILLIAM H. CAVER.